(12) United States Patent
Li et al.

(10) Patent No.: US 7,885,202 B2
(45) Date of Patent: Feb. 8, 2011

(54) METHOD AND APPARATUS FOR CHANNEL QUALITY INDICATOR REPORT

(75) Inventors: Xiaoqiang Li, Beijing (CN); Chengjun Sun, Beijing (CN); Yujian Zhang, Beijing (CN); Ju-Ho Lee, Suwon-si (KR)

(73) Assignees: Samsung Electronics Co., Ltd. (KR); Beijing Samsung Telecom R&D Center (CN)

( * ) Notice: Subject to any disclaimer, the term of this patent is extended or adjusted under 35 U.S.C. 154(b) by 144 days.

(21) Appl. No.: 12/158,881

(22) PCT Filed: Dec. 22, 2006

(86) PCT No.: PCT/KR2006/005671

§ 371 (c)(1),
(2), (4) Date: Oct. 17, 2008

(87) PCT Pub. No.: WO2007/073121

PCT Pub. Date: Jun. 28, 2007

(65) Prior Publication Data

US 2009/0196190 A1    Aug. 6, 2009

(30) Foreign Application Priority Data

Dec. 23, 2005   (CN) .................... 2005 1 0134076

(51) Int. Cl.
*H04L 12/26* (2006.01)
(52) U.S. Cl. ............... 370/252; 370/236.1; 370/310

(58) Field of Classification Search ......... 370/203–211, 370/252, 253, 236.1, 236.2, 310
See application file for complete search history.

(56) References Cited

U.S. PATENT DOCUMENTS 5,469,471 A    11/1995   Wheatley, III (Continued)

FOREIGN PATENT DOCUMENTS

RU    2 127 948    3/1999

(Continued)

OTHER PUBLICATIONS

Int'l Search Report (PCT/ISA/210) 2 pp.

*Primary Examiner*—Ricky Ngo
*Assistant Examiner*—Gary Mui
(74) *Attorney, Agent, or Firm*—The Farrell Law Firm, LLP

(57) ABSTRACT

A method for a UE reporting a CQI comprising steps of: obtaining a total number M of CQI report sub-bands in a system and a number N of CQI report sub-bands needed to be reported; measuring channel qualities of all sub-bands and according to the measurement result, determining N CQI report sub-bands needed to be reported and corresponding CQI values; sending a L-bit long sequence to a base station for indicating the sub-bands that need to be reported; sending CQI values corresponding to the sub-bands need to be reported to the base station. The present invention uses comparatively shorter bit sequence to indicate CQI report sub-bands needed to be reported and reduces the number of information bits necessary for CQI report sub-bands and also reduces the number of information bits corresponding to the CQI values in the CQI report sub-bands.

17 Claims, 13 Drawing Sheets

U.S. PATENT DOCUMENTS

| | | |
|---|---|---|
| 7,536,154 B2 * | 5/2009 | Rudolf et al. .................. 455/69 |
| 2004/0058687 A1 | 3/2004 | Kim et al. |
| 2005/0128993 A1 | 6/2005 | Yu et al. |
| 2005/0201295 A1 | 9/2005 | Kim et al. |
| 2006/0034244 A1 | 2/2006 | Huang et al. |
| 2006/0146920 A1 | 7/2006 | Suh et al. |
| 2007/0115796 A1 * | 5/2007 | Jeong et al. .................. 370/203 |
| 2009/0209261 A1 * | 8/2009 | Kuri et al. .................... 455/450 |

FOREIGN PATENT DOCUMENTS

WO    WO 2005/015801 A2 *    2/2005

* cited by examiner

FIG.4

401 — The index of the maximum CQI sub-band

402 — The maximum CQI absolute value

403 — Differential CQI value | Differential CQI value | ... | Differential CQI value The bit sequence indicating CQI report sub-bands Information bits indicating the reported sub-bands' CQI values

METHOD AND APPARATUS FOR CHANNEL QUALITY INDICATOR REPORT

PRIORITY

This application claims priority to China Appl. No. 200510134076.4 filed 23 Dec. 2005, and to PCT application number PCT/KR2006/005671 filed 22 Dec. 2006, the entire disclosure of each of which is incorporated herein by reference.

BACKGROUND OF THE INVENTION

1. Field of the Invention

The present invention relates to a wireless communication system, especially to a Channel Quality Indicator (CQI) report method for frequency scheduling in the wireless communication system.

2. Description of the Related Art

Now, the $3^{rd}$ Generation Mobile Communication System Partnership Project (referred to as 3GPP) standardization organization has commenced on Long-term Evolution (referred to as LTE) to existing system criteria. Among numerous physical layer transmission techniques, OFDM (Orthogonal Frequency Division Multiplex) becomes a challenging one in all downlink solutions, for it bears advantages such as higher spectrum utilization efficiency and lower processing complexity.

In nature, the OFDM is a multi-carrier modulation communication technique, and its basic principle is to divide a high rate data stream into multiple low rate data streams to transmit via a group of orthogonal sub-carriers simultaneously. Because of the features of multi-carrier, the OFDM technique bears superior performance in many aspects. (1) A remarkable superiority of the OFDM technique lies in that: inter-symbol interference (ISI) can be completely eliminated in the case that the channel delay is less than the length of CP (cyclic prefix, which is introduced in by adding guard spacing to each symbol) since data is transmitted through multiple sub-carriers in parallel and the length of symbol in each sub-carrier is correspondingly increased but with no sensitivity to channel delay. In this way, each sub-carrier experiences a flat fading channel. (2) The OFDM technique bears high spectrum utilization efficiency. In frequency domain, OFDM signals overlap actually. This overlap improves spectrum utilization efficiency in great extent. (3) The OFDM technique bears strong ability in anti-narrowband interference or resisting frequency selective fading. Through channel coding and interleaving, the frequency diversity effect and the time diversity effect can be achieved in OFDM so that either narrowband interference or frequency selective fading can be effectively resisted. (4) In the technique of OFDM, the modulation can be realized through the base-band IFFT, and IFFT/FFT bears available fast calculation method and can be conveniently implemented in a DSP chip and hardware structure.

In order to obtain larger throughput of data transmission in the OFDM wireless transmission system, frequency allocating can be applied in the data transmission. Each transmission channel of user usually suffers from different frequency domain fading in different frequency bands. Therefore, each user bears different channel quality in a frequency band. With frequency scheduling, frequency bands can be allocated to the users with better channel conditions to maximize the throughput of data transmission.

To implement frequency scheduling, it is necessary for the base station to learn about channel quality of the UE in each frequency band to be allocated. Therefore, it is necessary for each UE to report the CQI of all frequency bands to the base station. The number of information bits necessary for a single user to report the CQI to the base station equals the number of total information bits necessary for the corresponding CQI report in all frequency bands. Therefore, for each UE, the more allocated frequency bands to report, the heavier the corresponding necessary uplink signaling overhead is.

During a frequency allocating process, more information and more detail the base station obtains for channel quality of each UE, better scheduling gain will be reached according to the information. However, the more information report is, the heavier the overhead of uplink signaling is, and more impact is caused to uplink data transmission. Thus, it is necessary to turn to some better methods to reduce the uplink signaling overhead in CQI reporting as much as possible on the premise that specific frequency allocation gain is guaranteed.

At present, there are many methods for reducing corresponding signaling overhead in CQI reporting. A most often used method is that the UE reports the CQIs of some frequency bands with better channel qualities to the base station. But in this method, besides the CQI information bits of the corresponding report frequency bands extra information bits are necessary to be transmitted to the base station, indicating which frequency bands the reported CQIs belong to. Since the number of frequency bands to be reported is part of the number of entire frequency bands, corresponding signaling overhead is greatly reduced in this method.

At present, when reporting the CQIs of partial frequency bands, a bit-mapping method is used to indicate which frequency bands the reported CQIs belong to. With this method, if the system has total M CQIs to be reported, a sequence of M bits is adopted for indication, setting the sequence number of the bit corresponding to the frequency band needed to report as "1", and the sequence number of the bit corresponding to the frequency band needed not to report as "0".

As shown in FIG. 1, with the bit-mapping method in indicating the frequency bands to which the reported CQIs belong, the CQI report signaling contains a bit mapping sequence, each bit of which corresponds to a frequency band. If the bit is set as "1", the corresponding frequency band is the one to be reported by CQI; and if the bit is set as "0", the corresponding frequency band is not the one to be reported by CQI.

From the descriptions above, the signaling bits necessary for CQI reporting of partial frequency bands include two parts. One is to indicate the frequency band (which needs to be reported) with the bit-mapping method. The other is to report CQIs of the frequency bands.

With the bit-mapping method to indicate the frequency bands which need to be reported, the number of the necessary information bits depends on the number of total CQI report frequency bands but have nothing with the number of frequency bands which need to be reported. The number of information bits necessary for frequency band indicating equals the total number of frequency bands in the system. Therefore, if there are comparatively more frequency bands in the system, the signaling overhead is still heavy. It is necessary to adopt some new methods to perform further optimization on CQI reporting. For the CQI reporting of the selected frequency bands, some optimization methods may also be adopted to reduce the signaling overhead for total CQI reporting.

SUMMARY OF THE INVENTION

Therefore, an object of present invention is to provide a method to determine a number of information bits necessary for the reporting of CQI frequency bands by means of a total number of frequency bands and the number of CQI frequency bands that need to be reported.

According to one aspect of present invention, a method for a UE reporting a Channel Quality Indicator comprising steps of:

a) the UE obtaining a total number M of CQI report sub-bands in a system and a number N of CQI report sub-bands needed to be reported;

b) the UE measuring channel qualities of all sub-bands and according to the measurement result, the UE determining N CQI report sub-bands needed to be reported and the corresponding CQI values;

c) the UE sending a L-bit long sequence to a base station for indicating the sub-bands that need to be reported, and the length of the sequence is:

$$L=[\log_2 C_M^N];$$

d) the UE sending CQI values corresponding to the sub-bands needed to be reported to the base station.

According to another aspect of present invention, a method for a base station identifying Channel Quality Indication reported by a UE comprising steps of:

a) the base station receiving CQI signaling reported from the UE via a CQI report channel;

b) the base station extracting a L-bit long sequence indicating CQI report sub-bands from the CQI report signaling, and according to a relationship between combinations formed by picking N CQI report sub-bands out from M CQI report sub-bands and the L-bit long sequence, determining the CQI of which N sub-bands is reported by the UE;

c) obtaining CQI values of the report sub-bands extracted from the CQI signaling transmitted from the UE.

According to another aspect of present invention, an apparatus for a UE reporting Channel Quality Indication comprising an antenna, a RF receiver, an ADC, a guard spacing removing unit, an OFDM demodulation unit, further comprising:

a) a pilot signal-to-noise ratio measuring unit for measuring channel qualities of all sub-bands;

b) a UE control and process unit for determining frequency bands that need to be reported according to the channel qualities of all measured sub-bands, and according to a total number of sub-bands and a number of sub-bands that need to be reported, determining a bit sequence for the indication of report sub-bands and information bits for the indication of report CQI values to generate CQI report signaling;

c) a transmitter for transmitting the generated CQI report signaling to a base station.

Compared with the bit-mapping method, present invention adopts the method that uses comparatively shorter bit sequence to indicate CQI report sub-bands needed to be reported and reduces the number of information bits necessary for CQI report sub-bands and also reduces the number of information bits corresponding to the CQI values of CQI report sub-bands. Therefore the signaling overhead may be further reduced.

BRIEF DESCRIPTION OF THE DRAWINGS

FIG. 4 illustrates a format of the signaling used to indicate CQI value of CQI report sub-band;

DETAILED DESCRIPTION OF THE PREFERRED EMBODIMENTS

The present invention proposes a method for reporting CQI to minimize the signaling overhead in CQI reporting while obtaining a comparatively higher frequency scheduling gain.

The CQI report signaling of the UE consists of two parts:

The one indicating the indexes of the reported CQI sub-bands; and the other indicating the CQI values of the reported CQI report sub-bands.

Figures 1, 2:
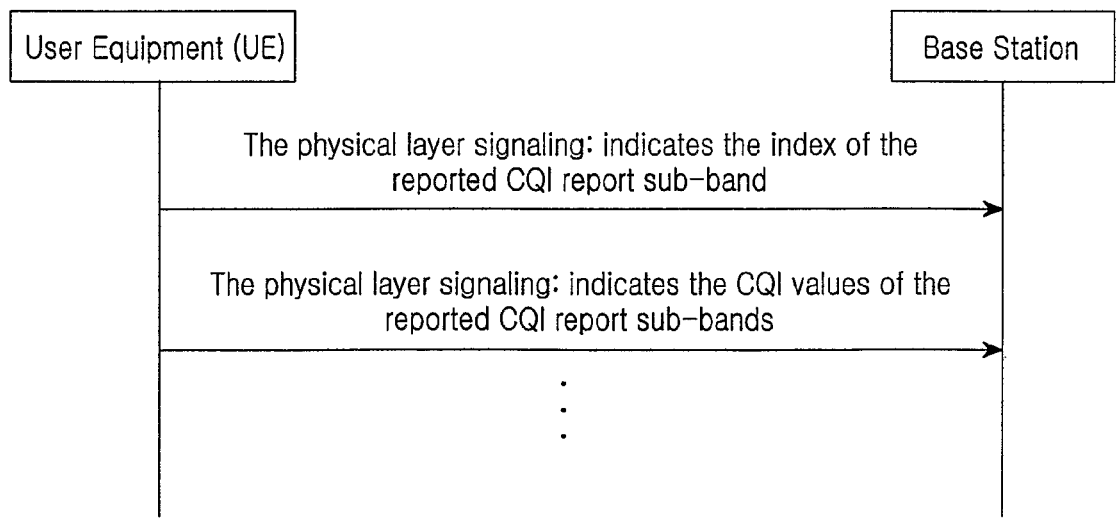
FIG. 1 illustrates a bit-mapping method for indicating report frequency bands.
FIG. 2 illustrates a process that CQI report signaling is transmitted via physical layer signaling.

Two approaches may be adopted for the UE to transmit the CQI report signaling:

Approach 1 is that the indication of the indexes of the reported sub-bands via the L-bit long sequence accompanies with the report of the CQI values in corresponding sub-bands. With this approach, the above two parts of signaling are transmitted via the physical layer signaling. Here, the so-called physical layer signaling is analogous to the CQI report signaling in 3GPP TS25.211. FIG. 2 illustrates a process that the physical layer signaling is adopted to transmit the two kinds of signaling.

Approach 2 is that the report of CQI report sub-band number reported via the L-bit long sequence accompanies with many times of report of the CQI values in corresponding sub-bands. With this approach, the above two parts of signaling are transmitted via either the physical layer signaling or higher layer signaling. Here, the so-called higher layer signaling is analogous to the RRC signaling in 3GPP RRC protocol. The transmission of its signaling may be as follows:

a) The physical layer signaling is first adopted to transmit the signaling for the indication of the indexes of reported sub-bands, and then is adopted to transmit the signaling for the CQI values in the reported CQI report sub-bands several times.

b) The higher layer signaling is first adopted to transmit the signaling for the indication of the indexes of reported sub-bands and then the physical layer signaling is adopted to transmit the signaling for the CQI values of the reported CQI report sub-bands several times.

c) The higher layer signaling is first adopted to transmit the signaling for indication of the indexes of reported sub-bands once and to transmit the signaling for the CQI values in the reported CQI report sub-bands once or several times, then the physical layer signaling is adopted to transmit the signaling for the CQI values in the reported CQI report sub-bands several times.

Figure 3A:
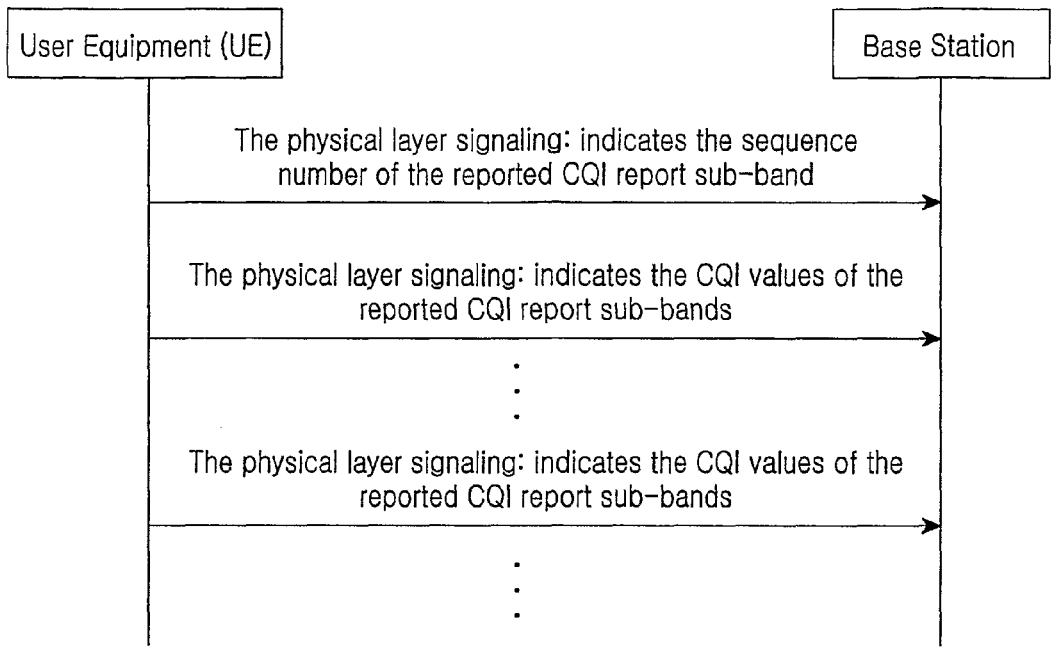
FIGS. 3A, 3B and 3C illustrate a process that CQI report signaling is transmitted via higher layer signaling and physical layer signaling.
Figure 3B:
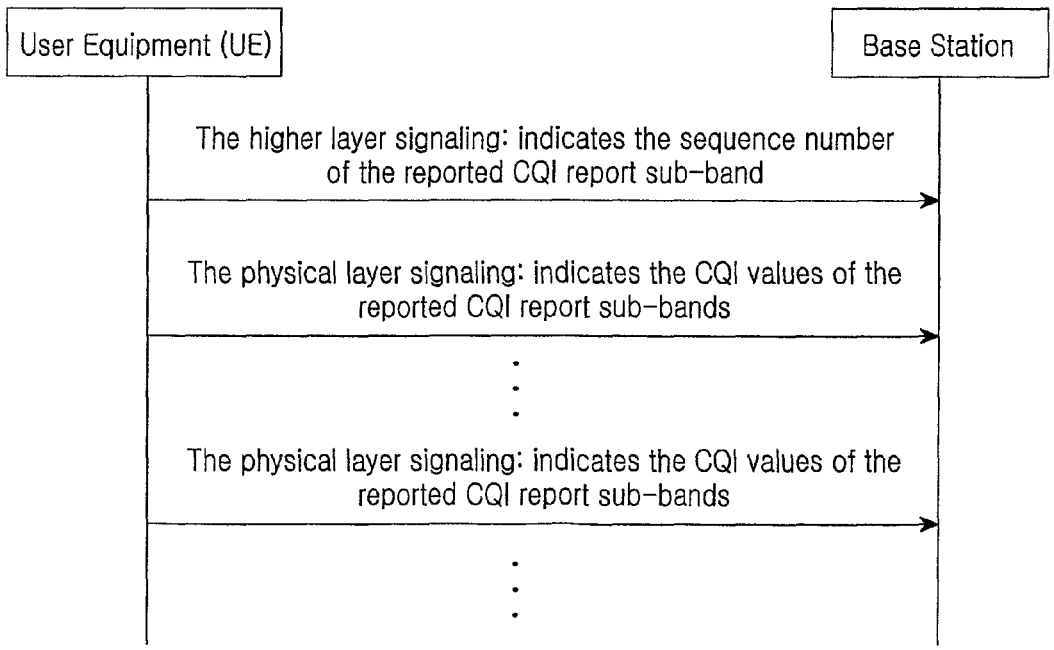
Figure 3C:
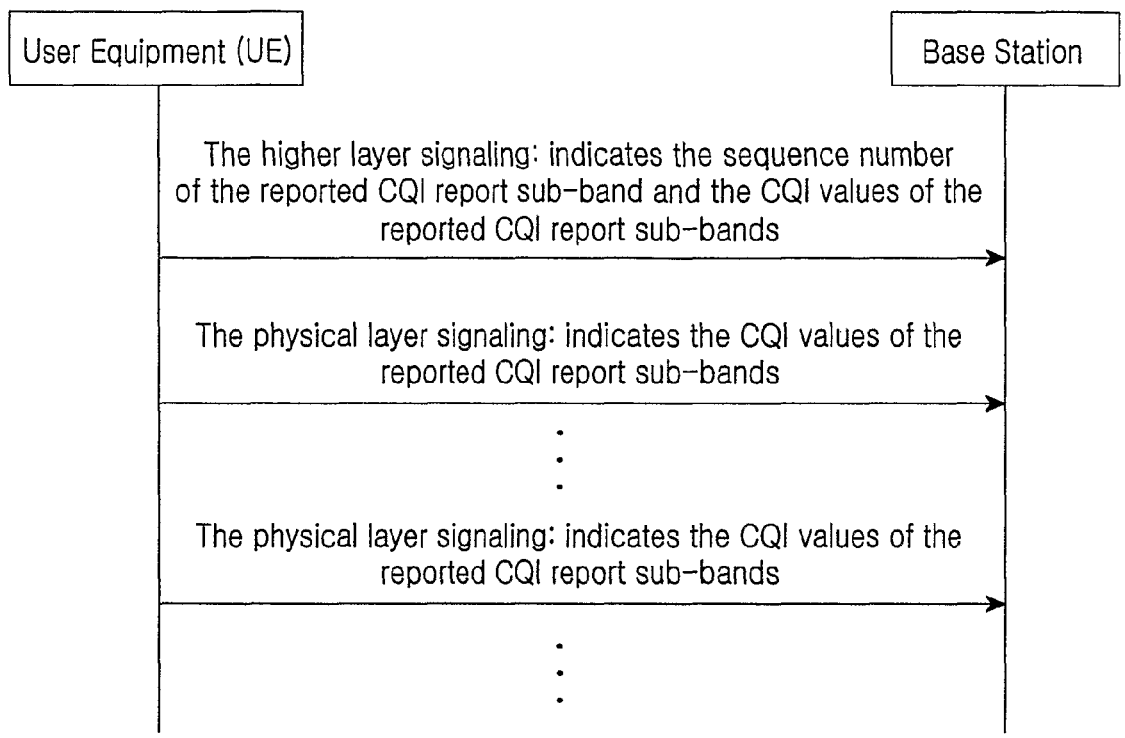

The signaling transmission diagrams of the three transmission methods using the higher layer and the physical layer signaling to transmit the two kinds of signaling are respectively illustrated in FIGS. 3A, 3B and 3C.

The method proposed in present invention to implement the signaling for indicating the index of the reported frequency sub-bands is to use a sequence to is indicate the index of the reported sub-bands. The detailed implementation process is as follows:

First, it is necessary to determine length L of the bit sequence for the indicated report frequency bands according to the number M of the total CQI report sub-bands in the system and the number N of the CQI sub-bands that the base station or the system requires to report. The length L can be obtained by a formula below:

$$L = \lceil \log_2 C_M^N \rceil \quad (1)$$

The value of the M is obtained by dividing the transmission bandwidth of the system by the bandwidth of the CQI report sub-band. N is no less than zero, but less than M.

Specific corresponding relationship exists between the L-bit long sequence and the combinations which are obtained by picking N CQI report sub-bands from M CQI report sub-bands. After the length of the bit sequence is determined already, it is necessary to sort the combinations which are obtained by picking N CQI report sub-bands from M CQI report sub-bands, and to correspond these possible select modes to the L-bit long sequence so that each combination which is obtained through picking N CQI report sub-bands from M CQI report sub-bands corresponds to a unique L-bit long sequence. In this way, the enumeration method may be adopted to indicate possible combinations (which are obtained through picking N CQI report sub-bands from M CQI report sub-bands) with the L-bit long sequence. Since L≦M, compared with the method which adopts M bits to map and indicate the selected CQI report sub-bands, the method reduces the number of necessary information bits.

Here, several kinds of corresponding relationships may exist between the L-bit long sequence and the combinations (which are obtained through picking N CQI report sub-bands from M CQI report sub-bands). However, it is necessary for each corresponding relationship to guarantee that each M-bit long sequence mapped from the combinations (which are obtained through picking N CQI report sub-bands from M CQI report sub-bands) correspond to a unique L-bit long sequence. If a M-bit long sequence with N bits set as "1" is used to denote the combinations (which are obtained through picking N CQI report sub-bands from M CQI report sub-bands), the corresponding relationship can be given in table 1 below:

TABLE 1

The corresponding relationship between the combinations (which are obtained through picking N CQI report sub-bands from M CQI report sub-bands) and the L-bit long sequence

| The L-bit long sequence $a_L, a_{L-1}, \ldots a_3, a_2, a_1$ | The M-bit long sequence with N bits set as "1" $b_M, b_{M-1}, \ldots b_4, b_3, b_2, b_1$ |
|---|---|
| 00 . . . 000 | 000 . . . 1 . . . 1 |
| 00 . . . 001 | 00 . . . 101 . . . 1 |
| 00 . . . 010 | 00 . . . 101 . . . 10 |
| . . . | . . . |
| 11 . . . 110 | . . . |
| 11 . . . 111 | . . . |

Here, if $L = \log_2 C_M^N$, a one-to-one mapping relationship may exist between the L-bit long sequence and the M-bit long sequence with N bits set as "1"; and if $L > \log_2 C_M^N$, the number of L-bit long sequence is greater than that of the M-bit long sequence with N bits set as "1". In this case, some L-bit long sequences are reserved.

If the corresponding relationship is known to both the network and the UE, when UE transmits the CQI report which includes the L-bit long sequence to the base station, the base station knows which CQI report sub-bands the UE reported CQIs belong to. Following approaches may be adopted by both UE and the network to obtain the corresponding relationship:

Method 1, both UE and the network store the same corresponding relationship mapping table and according to this table, the corresponding relationship may be found out.

Both the UE and the base station store the same table of possible corresponding relationships between the L-bit long sequence and the combinations (which are obtained through picking N CQI report sub-bands from M CQI report sub-bands) of N CQI report sub-bands which are selected from M CQI report sub-bands. In this table, all possible kinds of mapping relationships between the L-bit long sequence and the combinations (which are obtained through picking N CQI report sub-bands from M CQI report sub-bands) of N CQI report sub-bands are included. A possible corresponding relationship is that the M-bit long sequence with N bits set as "1" corresponds to the L-bit long sequence. When the UE hopes to report the CQIs of some N CQI report sub-bands, it finds out the L-bit long sequence corresponding to the M-bit long sequence with N bits (which correspond to N CQI report sub-bands) set as "1", then transmits the L-bit long sequence to the base station by including it in the CQI report. After the base station receives this CQI measurement report, it first extracts the L-bit long sequence which indicates the reported frequency sub-bands. According to this bit sequence, in the table of corresponding relationship between the L-bit long sequence and the M-bit long sequence with N bits set as "1", the N bits (which have been set as "1") in the M-bit long sequence corresponding to the L-bit long sequence is found out to learn about which CQI report sub-bands the UE reported CQIs belong to. Then, the signaling for the report frequency band is calculated to complete the identification process on the reported CQIs of the UE. Now, the base station knows UE reported frequency bands and the corresponding CQI values.

Method 2, in the case that a unique fixed relationship exists between the combination of N CQI report sub-bands which are selected from M CQI report sub-bands and the L-bit long sequence, UE and the base station respectively adopts certain algorithms to calculate the corresponding relationship.

In this method, to report the CQIs of the N CQI report sub-bands selected from M CQI report sub-bands, it is necessary for UE to determine the L-bit long sequence corresponding to the combinations (which are obtained through picking N CQI report sub-bands from M CQI report sub-bands) of N CQI report sub-bands selected from M CQI report sub-bands according to certain algorithm. Then it transmits the L-bit long sequence to the base station by including it in the CQI report. After the base station receives this CQI measure report, it first extracts the L-bit long sequence indicating the CQI report sub-band, then calculates to which frequency bands the L-bit long sequence corresponds according to certain algorithm. Then, it extracts the signaling for indication of the CQI values in the reported frequency sub-bands to complete the identification process on the reported CQIs of the UE. Now, the base station knows the CQI report sub-bands reported by the UE and the corresponding CQI values in each CQI report sub-bands.

Method 3, the UE and the network respectively adopt certain formula to calculate the corresponding relationship between the L-bit long sequence and the M-bit long sequence with N bits set as "1".

In this method, in order to report the CQIs of the N CQI report sub-bands selected from M CQI report sub-bands, it is necessary for the UE to determine the M-bit long sequence with N bit set as "1" which corresponds to N sub-bands. According to certain formula, it calculates the value of the bits in the L-bit long sequence which needs to be transmitted, and then it transmits the L-bit long sequence to the base station by including it in the CQI report. After the base station receives this L-bit long sequence, it needs to calculate the M-bit long sequence with N bits set as "1" according to certain formula and the L-bit long sequence to learn about which CQI reported sub-bands the UE reported CQIs belong to. Then, it extracts the signaling for indication of CQI in the reported frequency sub-bands to complete the identification process on UE's reported CQIs. Now, the base station knows UE's reported CQI report sub-bands and the corresponding CQI values.

After the description for indicating the reported CQI report sub-band, a method for realizing the signaling for indicating the CQI values of the report frequency bands is described below. In this method, some information bits are used to indicate the sub-band with the most optimal channel quality and its corresponding absolute CQI value. Then the differential method is adopted to report the differential value between the CQI value of the CQI report sub-band (which bears most optimal channel quality) and the CQI absolute value of other reported sub-bands in virtue of information bits to complete the report of the CQI values in all CQI report sub-bands. The format of the signaling for the indication of CQI value in reported sub-bands is shown FIG. 4, where:

401 stands for the information bit indicating the index of the CQI report sub-band which bears maximum CQI value. This information bit indicates the CQI report sub-band which bears maximum CQI value among the reported N CQI report sub-bands, i.e., it indicates the index of the CQI report sub-band which bears maximum CQI value among the N sub-bands. Since the sub-band needed to be indicated is one of the N CQI report sub-bands, the necessary number of information bits may be $N_{i\_max}$:

$$N_{i\_max} = \lceil \log_2 N \rceil \quad (2)$$

Where, $N_{i\_max}$ information bits are enough to indicate which sub-band bears maximum CQI value among the reported N CQI report sub-bands.

402 stands for the information bits that indicate the CQI value of the CQI report sub-band which bears maximum CQI value. The number information bits necessary for the report of the maximum value equals the one necessary for the report of absolute CQI value.

403 stands for the information bits adopted to present the differences between other N−1 CQI report sub-bands' CQI values and the maximum CQI value. If it is necessary to adopt $N_{diff}$ bits to present the differences in a sub-band, the number of information bits necessary to present the differences of the N−1 sub-bands should be:

$$N_{diff\_tot} = (N-1) \cdot N_{diff} \quad (3)$$

It is noted that the number of information bits necessary for the denotation of the differences is usually limited by the system, i.e., constraint is done to the denotation of maximum difference with the number of the difference bits. In this way, the denotation of CQI values with difference bits will be confined to be less than the maximum CQI value but greater than the difference between the maximum CQI value and the maximum difference value. In the method of present invention, if the CQI value in some CQI report sub-band is lower than the value of the maximum CQI value minus the maximum difference value, it will be denoted with the maximum difference bit, viz., the maximum difference value.

In this way, with these three kinds of information bits, the CQI values of the N CQI report sub-bands that need to be reported can be well denoted.

Figure 5:
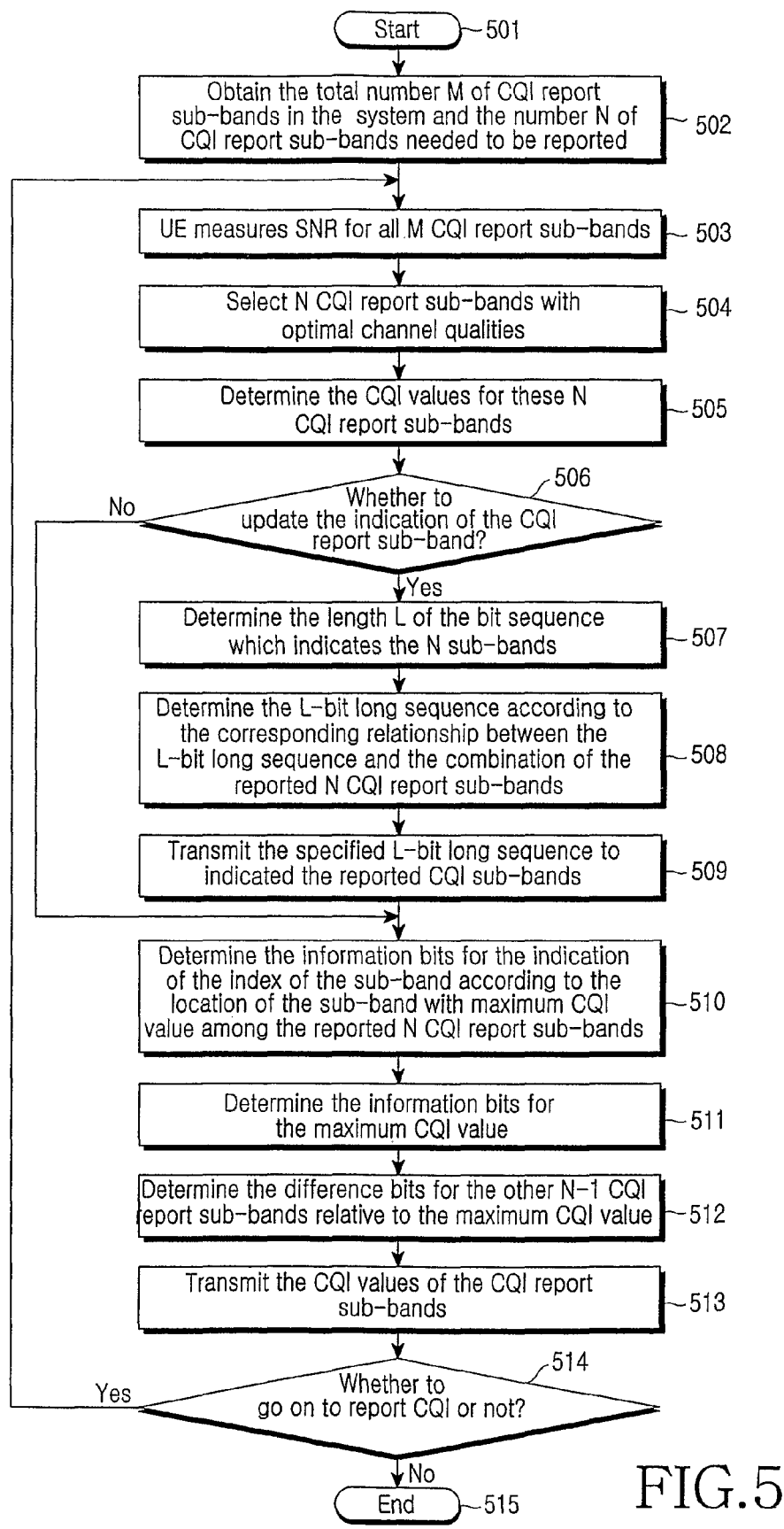
FIG. 5 illustrates operating steps for a UE in implementing CQI reporting.

In this following, steps for UE in its implementation of CQI reporting with the method proposed in present invention is given, as shown in FIG. 5:

501, Start;

502, the total number M of CQI report sub-bands of the system and the number N of CQI report sub-band that need to be reported are obtained. The method with which UE obtains M and N can be determined in criterion with no notification. Or it can be informed by the network via signaling notification. This notification can either be periodical or event-triggered. In the case that the signaling notification is adopted via the network, the notification can be implemented by sending RRC signaling from the entity of the RRC protocol terminal in the network entity to UE to inform it of the values of M and N.

503, the UE measures channel qualities for the all M CQI report sub-bands;

504, the UE selects N CQI report sub-bands with optimal channel qualities from all measured CQI report sub-bands;

505, the UE determines the CQI values to be reported according to the signal-to-noise ratio of the measured N CQI report sub-bands;

506, the UE judges whether to send the indication of CQI report sub-band or not. If so, go to 507, otherwise, to 510.

If the first approach previously mentioned is adopted to transmit the CQI report signaling, i.e., the indication of the indexes of the reported sub-bands via the L-bit long sequence accompanies with the report of the CQI values in corresponding sub-bands, the judging result is always true in any case, that is to say, it directly goes to step 507.

In the case that the second approach previously mentioned is adopted to transmit the CQI report signaling, i.e., after the indication of the reported CQI sub-bands with the L bit long sequence, several times of the indication of corresponding CQI values will be transmitted. In this case, the determination of how many times the CQI values in corresponding sub-band should be re-transmitted is realized through either event-triggered or periodical determination. In the case of event-triggered determination, no L-bit long sequence but the CQI values in corresponding sub-bands will be transmitted if no change takes place to the CQI report sub-bands which needs to be reported. In the case of periodical determination, the feasible method is to transmit the L-bit long sequence once followed by specific times of transmission of the CQI value in the corresponding frequency band.

It is noted that the signaling for the transmission of the sequence number of the reported CQI report sub-bands indicated by the L-bit long sequence could be either the physical layer signaling or higher layer signaling.

In the case that the signaling for the transmission of the L-bit long sequence is the physical layer one, the signaling for the transmission of the CQI value in the corresponding frequency sub-bands is also a physical layer signaling.

In the case that the higher layer signaling is used to transmit the L-bit long sequence, after the signaling is transmitted, the physical layer signaling is used to transmit the CQI values in the corresponding frequency bands. An alternative method could be, after the signaling is transmitted, the higher layer signaling is used to transmit the CQI values in the corresponding frequency bands once or several times. Then the physical layer signaling is adopted to transmit the CQI values in corresponding frequency bands several times.

507, By formula (1), the length L of the bit sequence used to indicate the reported N CQI report sub-bands is determined according to the values of M and N;

508, the L-bit long sequence is determined according to the corresponding relationship between the combinations (which are obtained through picking N CQI report sub-bands from M CQI report sub-bands) and the L-bit long sequence, as well as the combination selected for this time reporting of N CQI report sub-bands.

509, the determined L-bit long sequence are transmitted to the base station to indicate the CQI reported sub-bands;

510, By formula (2), the information bits for the indication of the index of the sub-band bearing a maximum CQI value among the N CQI report sub-bands is determined according to the location where the sub-band bearing maximum CQI value is among the reported N CQI report sub-bands;

511, the information bits necessary for the report of the maximum CQI value is determined according to the maximum CQI value of the N CQI report sub-bands;

512, the difference bits for the indication of the differential values between the CQI values in the N−1 reported sub-bands and the maximum CQI value are determined according to the differences between the maximum CQI value and the CQI values in other N−1 CQI report sub-bands;

513, the CQI values in the CQI report sub-bands are transmitted. This signaling includes the information bits indicating the index of the sub-band that bears maximum CQI value, the information bit for the indication of the maximum CQI value, and the differential bits for the indication of the differences between the maximum CQI value and the CQI values in other N−1 sub-bands.

514, Judge whether to go on to report CQI or not, if yes, please go to 503; otherwise, to 515; Here the decision can be made according to whether the transmission of current downlink data terminates or not. If yes, no CQI report continues; otherwise, continue to report CQI.

515, end.

Figure 6:
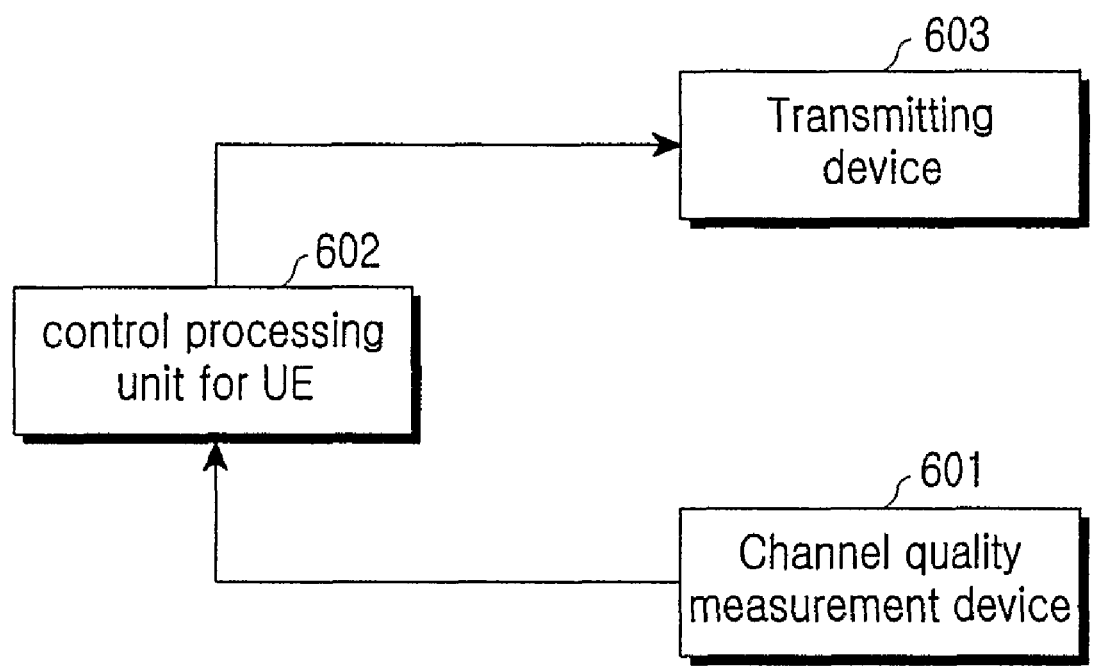
FIG. 6 shows an apparatus for a UE in implementing CQI reporting

The apparatus for the UE in implementing CQI reporting are shown in FIG. 6.

In this figure, the function that UE implements in the control processing unit 602 embodies present invention. With the channel quality measuring device 601, the UE measures the channel qualities for all sub-bands. Then it sends the measured data to the control processing unit 602.

According to previously described method, the control processing unit determines the L-bit long sequence for the indication of CQI report sub-bands. According to the result of the channel qualities sent from the measuring device, the CQI values for CQI report sub-bands is determined and the information bits for the transmission of CQI values in CQI report sub-bands are determined. Here, the applied method is to determine the information bits for the index of the sub-band bearing the maximum CQI value, the information bit for the indication of the maximum CQI value, and the differential bits for the indication of the differences between the maximum CQI value and CQI values in the other sub-bands. Thus, the CQI report signaling including the L-bit long sequence indicating CQI report sub-bands and the information bits reporting CQI values in corresponding sub-band is obtained. Then, the CQI report signaling may be transmitted to the base station through the transmitting device 603. Two approaches are adopted:

One is that the indication of the indexes of the reported sub-bands via the L-bit long sequence accompanies with the report of the CQI values in corresponding sub-bands.

The other is that after the indication of the reported CQI sub-bands with the L bit long sequence, several times of the indication of corresponding CQI values will be transmitted.

Figure 7:
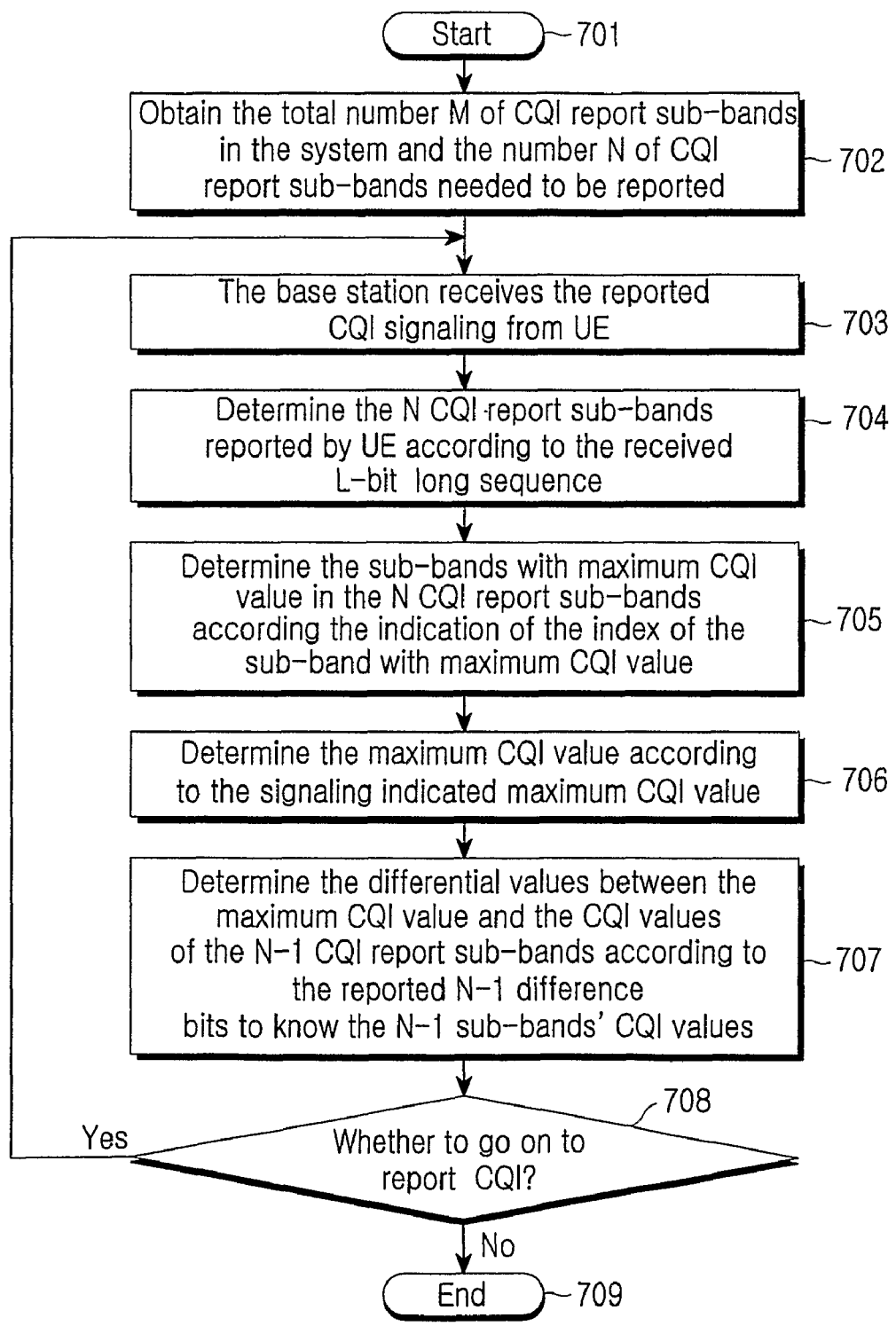
FIG. 7 illustrates operating steps for a base station in receiving of CQI report.

The process adopted by the base station according to present invention is explained to receive CQI signaling reported from UE and to calculate the reported CQI value. As shown in FIG. 7:

701, Start;

702, the base station obtains total number M of CQI report sub-bands in the system and the number N of CQI report sub-band that need to be reported. Here, the number of CQI report sub-bands that need to be reported to the base station may be either the regular number of report sub-bands in the system, or the notification sent from the network entity via signaling (this notification may be regulated or event-driven), or the number of sub-bands needed to report determined by the regulated approach or event-driven approach;

703, the base station receives the CQI signaling reported from the UE via the CQI report channel;

704, the base station extracts the L-bit long sequence (which indicates the report sub-bands) from the CQI report signaling, and determines the N CQI report sub-bands reported by UE according to the corresponding relationship between the combination of the N CQI report sub-bands selected from the M sub-bands and the L-bit long sequence;

Then the base station extracts the CQI value in the report sub-band in the CQI signaling transmitted from UE. The method adopted to calculate the CQI value in the report sub-band includes following steps:

705, which sub-band bears the maximum CQI value among N CQI report sub-bands are determined according to the extracted information bits that indicate the index of the sub-band which bears the maximum CQI value;

706, the reported maximum CQI value is determined according to the extracted information bits that indicate the maximum CQI value;

707, the CQI values for the other N−1 CQI report sub-bands are determined according to the extracted maximum CQI value and the difference bits that indicate the difference values between the CQI values in the other N−1 CQI report sub-bands and the maximum CQI value;

Then, go to step 708 to determine whether to receive CQI or not. If yes, go to 703; otherwise, go to 709. The determination may also be made according to whether current transmission of data from the UE terminates or nor. If yes, stop receiving CQI; otherwise, go to receive CQI.

709, end.

Embodiments

To clearly illustrate the method according to present invention, embodiments are given in the following.

Firstly, an example for determining the total number M of CQI report sub-bands in the system is described.

M is determined through dividing the transmission bandwidth of the system by the bandwidth of the CQI report sub-band.

According to the discussion in 3GPP LTE system at present, the system bandwidth may be 1.25M, 2.5M, 5M, 10M, 15M or 20M, and the corresponding transmission bandwidth can be 1.125M, 2.25M, 4.5M, 9M, 13.5M or 18M respectively. It is noted that the transmission bandwidth is smaller than the bandwidth of the system since the bandwidth of the system equals the transmission bandwidth plus the guard bandwidth.

Some examples for calculating M are given in the following:

If the system bandwidth is 10 MHz, i.e., the transmission bandwidth is 9M, and the bandwidth of the CQI reported sub-band is 750 KHz, then M=9M/750K=12;

If the system bandwidth is 20 MHz, i.e., the transmission bandwidth is 18M, and the bandwidth of the CQI reported sub-band is 750 KHz, then M=18M/750K=24;

If the system bandwidth is 4.5 MHz, and the bandwidth of the CQI reported sub-band is 375 KHz, then M=4.5M/375K=12;

It is noted that the maximum bandwidth of the CQI reported sub-bands is transmission bandwidth of the system, and the minimum is the width of the OFDM sub-carrier. In the discussion in current 3GPP LTE system, the maximum system bandwidth is 20M, i.e., the transmission bandwidth is 18M, and the width of a sub-carrier is 15K. In this way, M is confined within the range: $1 \leq M \leq 1200$.

The number N of CQI report sub-bands that are required by the system to be reported is confined within the range: $0 \leq N \leq M$. The certain value may be determined by criterion or notified by the signaling from the network entity.

In the following, an example for implementing CQI report is given:

In this example, the total number M of CQI report sub-bands in the system is 12, i.e., M=12. The number of CQI report sub-bands that each UE must report is fixed to be 3, i.e., N=3. With the proposed method, the number of all possible combinations for the three sub-bands that need to be reported is $C_{12}^3 = 220$. In this way, the length L of the sequence that is used to indicate the report sub-bands is:

$$L = \lceil \log_2 C_{12}^3 \rceil = 8$$

If the method using the saved corresponding relationship between the L-bit long sequence and the combination number obtained through selecting N from the M CQI report sub-bands is applied here, the corresponding relationship between the 8-bit sequence and the combination forms obtained through selecting 3 CQI report sub-bands from 12 CQI report sub-bands should be stored in both UE and the network entity. A possible corresponding relationship is illustrated in the table below:

TABLE 2

Corresponding relationship between the 8-bit sequence and the combination forms obtained through selecting 3 CQI report sub-bands from 12 CQI report sub-bands

| 8-bit long sequence $a_8, a_7, a_6, a_5, a_4, a_3, a_2, a_1$ | 12-bit long bit-mapped sequence with 3 bits set as "1" $b_{12}, b_{11}, b_{10}, b_9, b_8, b_7, b_6, b_5, b_4, b_3, b_2, b_1$ |
|---|---|
| 0000 0000 | 000000 000111 |
| 0000 0001 | 000000 001011 |
| 0000 0010 | 000000 001101 |
| 0000 0011 | 000000 001110 |
| 0000 0100 | 000000 010011 |
| ... | ... |
| 0001 0110 | 000001 000110 |
| 0001 0111 | 000001 1001001 |
| ... | ... |
| 1101 1011 | 111000 000000 |
| 1101 1100 | The reserved sequence |
| ... | ... |
| 1111 1111 | The reserved sequence |

Figure 8:
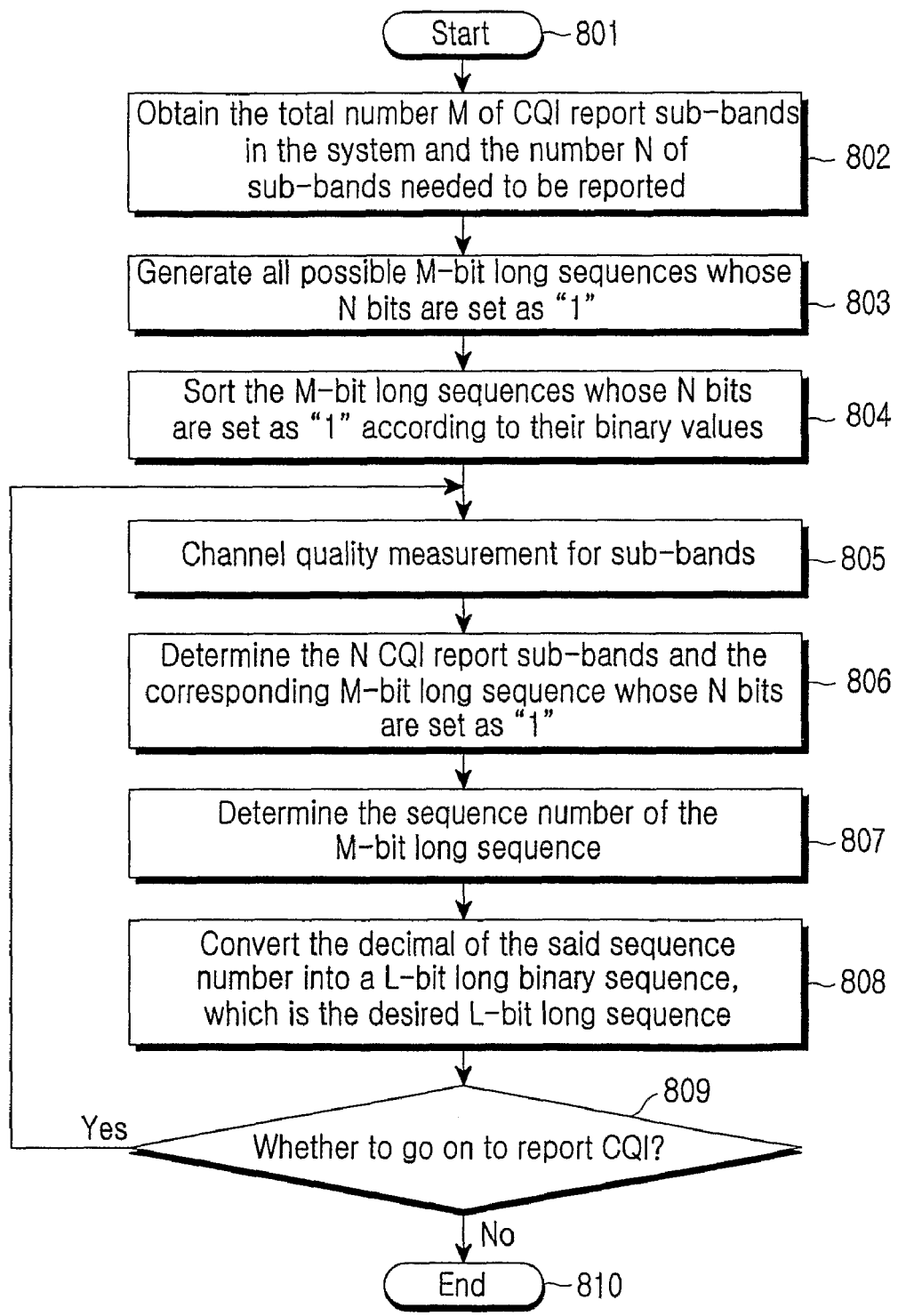
FIG. 8 illustrates an example of algorithm adopted in a UE to determine a corresponding relationship between the combinations which are formed by picking N CQI report sub-bands out from M CQI report sub-bands and a L-bit long sequence.

If the method for calculating with the algorithm may be realized here, an algorithm example is given in the following:

In the UE, the flow of implementing the algorithm is shown FIG. 8. It includes following steps:

801, Start;

802, the UE obtains the total number M of frequency bands in the system and the number N of CQI report sub-bands needed to be reported;

803, all possible M-bit long sequences whose N bits are set as "1" are generated;

804, the generated sequences are sorted in ascending (descending) order according to their binary values;

805, the UE measures the channel qualities for all sub-bands;

806, N CQI report sub-bands (which bear optimal channel qualities) are selected as the N sub-bands to be reported, and the M-bit long bit-mapped sequence (whose N bits are set as "1") corresponding to the combinations formed by selecting N sub-bands from the M CQI report sub-bands is determined;

807, According to the M-bit long sequence whose N bits are set as "1", the index of the sorted M-bit long sequences whose N bits are set as "1" is found out;

808, the decimal of the index is converted into a L-bit long binary sequence, which is the desired L-bit long sequence;

809, whether to transmit data or not is determined. If yes, go to 805; otherwise, 810;

810, end.

Figure 9:
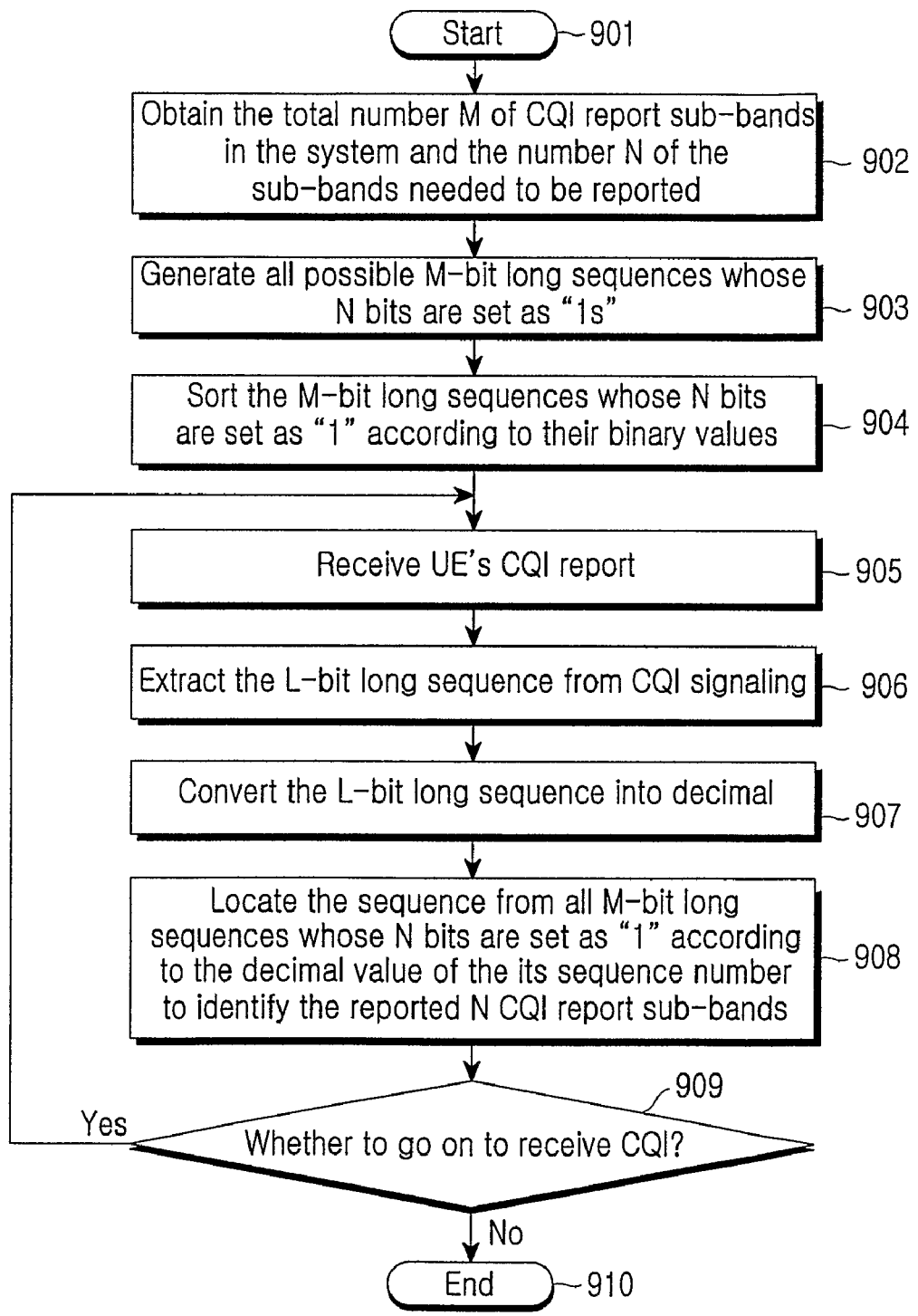
FIG. 9 illustrates an example of algorithm adopted in the base station to determine a corresponding relationship between the combinations which are formed by picking N CQI report sub-bands out from M CQI report sub-bands and a L-bit long sequence.

In the base station, the algorithm flow is illustrated in FIG. 9. It includes following steps:

901, Start;

902, the base station obtains the total number M of CQI report sub-bands in the system and the number N of CQI report sub-bands needed to be reported;

903, all possible M-bit long sequences whose N bits are set as "1" are generated;

904, the generated sequences are sorted in ascending (descending) order according to their binary values;

905, the base station receives the CQI report signaling from the UE;

906, the L-bit long sequence is extracted from the CQI report signaling;

907, this L-bit long sequence is converted into a decimal number;

908, the sequence from all M-bit long sequences whose N bits are set as "1" is located according to the decimal value of its sequence number. Thus, the base station obtains the N CQI report sub-bands reported by the UE;

909, whether to receive CQI or not is determined. If yes, go to 905; otherwise, 910;

910, end.

According to above algorithm, both the UE and the base station may obtain the corresponding relationship between the L-bit long sequence and the combinations formed through selecting N CQI report sub-bands from M CQI report sub-bands.

Figure 10:
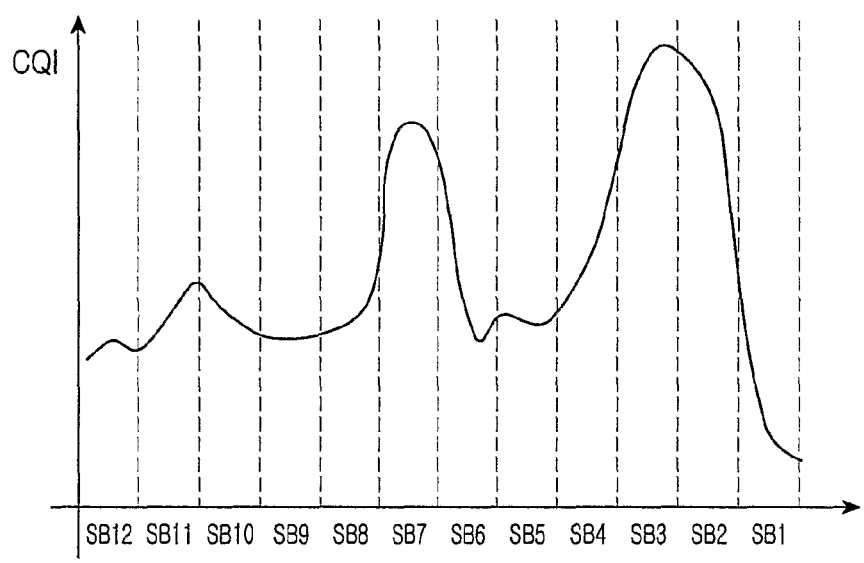
FIG. 10 illustrates distribution diagram for CQI values of each CQI report sub-bands according to an embodiment.

An example on CQI reporting is given below. And the channel qualities of the 12 CQI report sub-bands are given in FIG. 10 for UE. From this figure, it can be seen that: among the sub-bands SB1 through SB12, three sub-bands (SB2, SB3 and SB7) bear the maximum CQI value. In the case of adopting the bit mapping method on indicating, it is necessary to use 12-bit long sequence "000001 000110" for the indication.

But in the case of the previously described method that stores the corresponding relationship table or the method that determines the corresponding relationship by algorithm, find out the 8-bit long sequence corresponding to the sequence. Now, the 8-bit long sequence "0001 0110" (as shown in Table 2) may be used for the indication.

From this example, it can be seen that: compared with the bit mapping method, the method according to present invention for indicating reported frequency band may reduce 4 bits of signaling overhead.

After the reported frequency band is indicated, an embodiment for indicating the CQI values in the report frequency bands is mentioned. With the method above, the report sub-bands SB2, SB3 and SB7 may be well indicated. Then, it is necessary to indicate the index of the sub-band that bear maximum value. In this example, since three CQI report sub-bands are needed to report, the number of information bits necessary to indicate the sequence number of the sub-bands bearing the maximum CQI value may be determined by formula (2):

$$N_{i\_max} = \lceil \log_2 N \rceil = \lceil \log_2 3 \rceil = 2$$

In this example, sub-band SB3 bears the maximum CQI value and SB3 is the second one in three sub-bands. So that it is necessary to use binary bits "10" to present the indication.

Then, it is necessary to indicate the maximum CQI absolute value. Suppose that the system uses 5 bits to present a CQI absolute value. In this example, suppose the decimal of the maximum CQI value is "30", then 5 bits are used to present this CQI value as "11110".

Next, it is required to present CQI values in other two sub-bands. Here, a difference method is applied. In this example, suppose to use 2 bits to denote this difference value, and CQI value in SB2 is "29" (one less than the maximum CQI value), CQI value in SB7 is "25" (five less than the maximum CQI value), then SB2 may be denoted by "01" and SB7 by "11". It is noted that the difference between CQI value in SB7 and the maximum CQI value exceeds the range that the difference bits can present, nothing but the maximum difference bits should be used to denote this difference value. Therefore, certain error exists in this CQI reporting method. However, this kind of error is tolerable within a definite range.

Figure 11A:
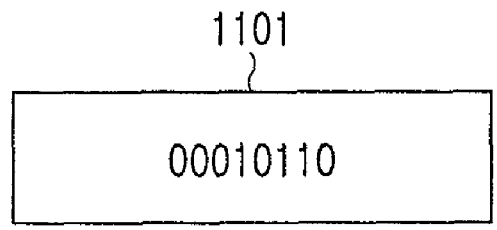
FIGS. 11A and 11B illustrate a format of signaling for reporting CQI according to an embodiment.
Figure 11B:
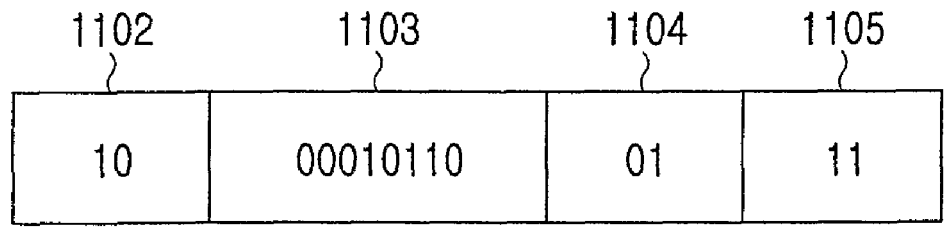

The format of the final CQI report signaling in this example is shown in FIGS. 11A and 11B. CQI report signaling consists of two parts:

The first part is the bit sequence 1101 which indicates the CQI report sub-bands. The binary value of the sequence is "0001 0110", as shown in FIG. 11A:

The second part is the information bits that indicate the reported sub-bands' CQI values, as shown in FIG. 11B. The information bits include following contents:

1102, information bits "10" that indicate where the CQI report sub-band bearing the maximum CQI value locates in among the report sub-bands;

1103, information bits "11110" that indicate the maximum CQI value;

1104, information bits "01" that indicate the difference value of SB2;

1105, information bits "11" that indicate the difference value of SB7.

The two parts of the signaling for CQI transmitting can be transmitted simultaneously, or one part first, then the second. In addition, one transmission of the first part of the CQI report signaling accompanies one transmission of the second part indicating the CQI values in the corresponding sub-bands. Or one transmission of the first part of the CQI report signaling accompanies several transmissions of the changed second part of the signaling.

The method for transmitting CQI report signaling consists that:

the first part of the signaling is transmitted via the physical layer signaling and the second also via the physical layer signaling;

the first part of the signaling is transmitted via the higher layer signaling and then the changed second via the physical layer signaling several times;

the first part of the signaling is transmitted via the higher layer signaling, then the higher layer signaling is used to indicate the CQI value in the corresponding CQI report sub-band once; next, the physical layer signaling is used to transmit the second part of the signaling several times.

Figure 12:
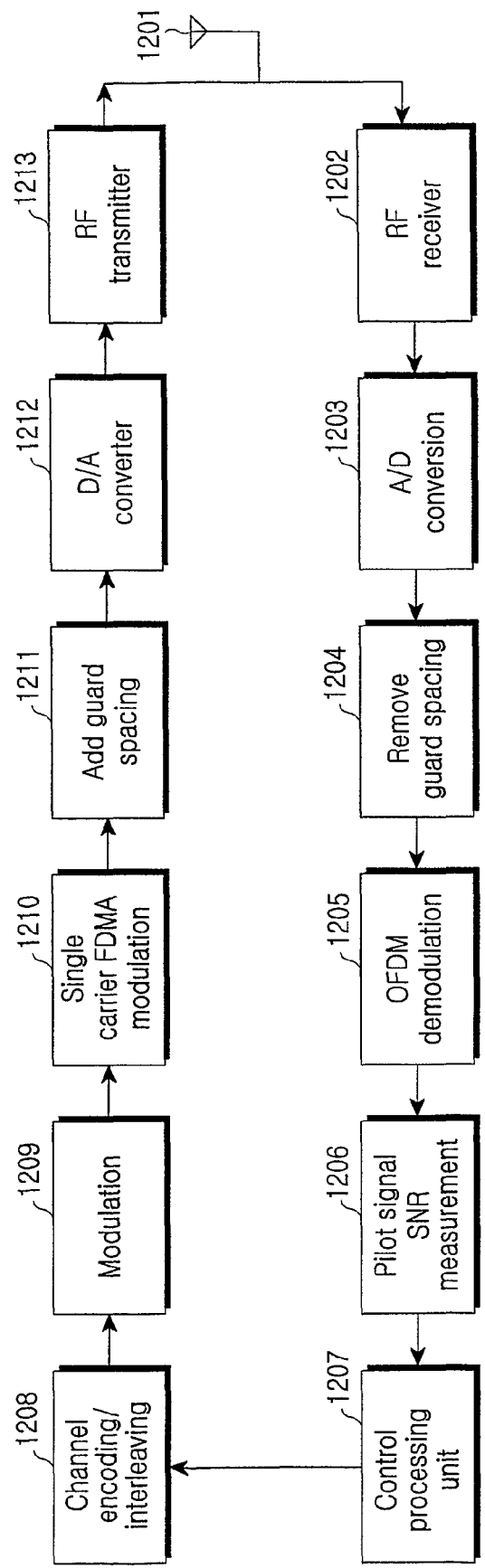
FIG. 12 shows an example of hardware for UE in CQI reporting according to an embodiment.

FIG. 12 illustrates a diagram of hardware for a UE in implementing CQI reporting with the method according to present invention. The UE receives signaling through antenna 1201, processes through the RF receiver 1202, performs ADC in 1203, removes guard spacing in 1204, performs OFDM demodulation (DFT transformation) in 1205, and measures the SNR of the pilots on all sub-bands in 1206, and transmits the measure result to the control processing unit 1207.

According to previously described method, the control processing unit determines the L-bit long sequence for the indication of CQI report sub-bands. According to the result of the channel qualities sent from the measuring device, it determines the CQI values for CQI report sub-bands and further determines the information bits for the transmission of the CQI values in CQI report sub-bands. Here, the applied method is to determine the information bits for the index of the sub-band which bears maximum CQI value, the information bit for the indication of the maximum CQI value, and the difference bits for the indication of the differential value between the maximum CQI value and CQI values in the other sub-bands. Thus, the CQI report signaling including L-bit long sequence indicating CQI report sub-bands and the information bits reporting CQI values in corresponding sub-bands is obtained.

Then, through channel encoding/interleaving 1208, modulating 1209, single carrier FDMA modulating 1210, guard spacing adding 1211, digital-to-analog converting 1212, the RF transmitter 1213, and the antenna 1201, the determined CQI signaling is transmitted to the base station.

Figure 13:
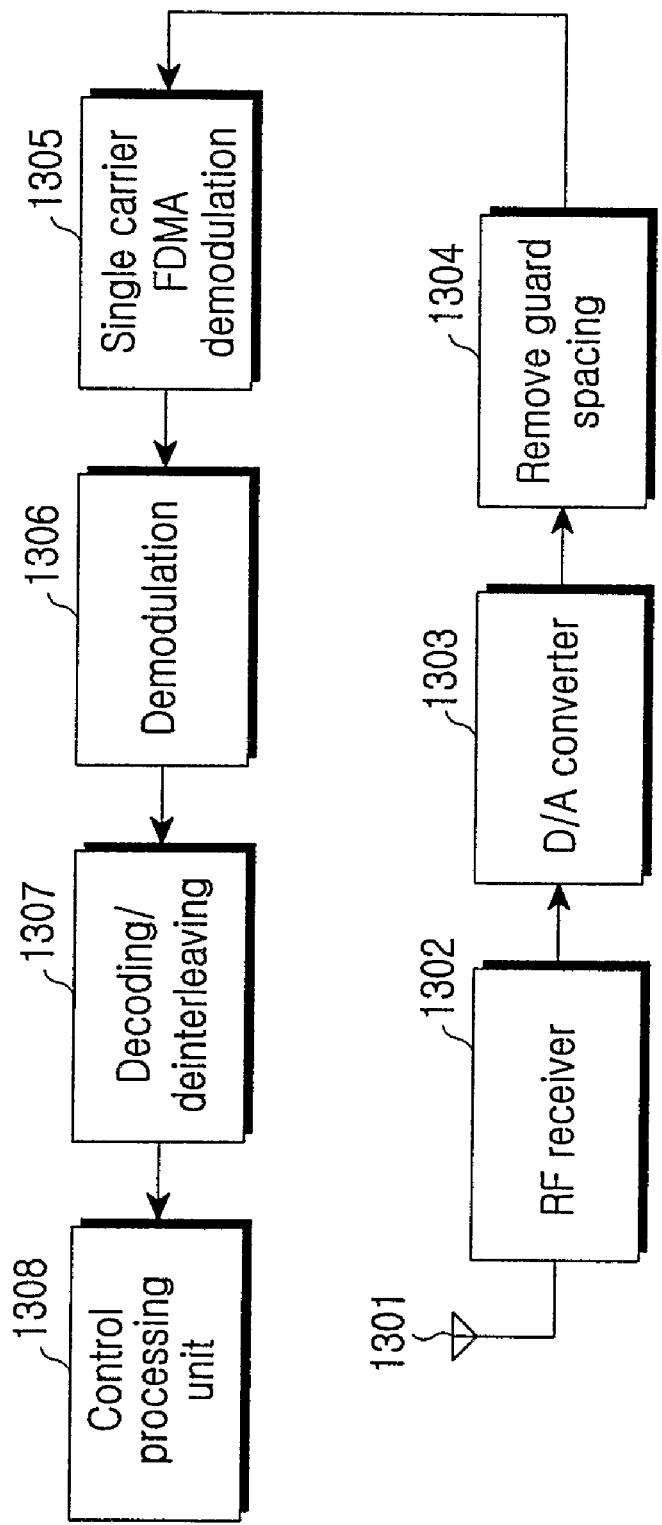
FIG. 13 shows an example of hardware for a base station in CQI receiving according to an embodiment.

FIG. 13 illustrates a diagram of hardware for the base station in implementing CQI report receiving with the method proposed in present invention. The base station receives signaling through antenna 1301, processes through the RF receiver 1302, performs ADC in 1303, removes guard spacing in 1304, performs single carrier FDMA demodulation in 1305, performs demodulation in 1306, performs de-coding/de-interleaving in 1307, to obtain the information bits for CQI reported by UE. These information bits are input into the control processing unit 1308. In this unit, according to previous described method, all the problems which sub-bands are reported by UE, which sub-band bears the maximum CQI value, what the maximum CQI value is, and what the differential values between the other report sub-bands and the maximum value, can be well settled. Therefore, the CQI values of all report sub-bands can be obtained. Thus the CQI report detecting is completed.

What is claimed is:

1. A method for a UE reporting a Channel Quality Indicator comprising steps of:
    a) the UE obtaining a total number M of CQI report sub-bands in a system and a number N of CQI report sub-bands needed to be reported;
    b) the UE measuring channel qualities of all sub-bands and according to the measurement result, the UE determining N CQI report sub-bands needed to be reported and the corresponding CQI values;
    c) the UE sending a L-bit long sequence to a base station for indicating the sub-bands that need to be reported, and the length of the sequence is: $L=\lceil \log_2 C_M^N \rceil$, where C is a combination function; and
    d) the UE sending CQI values corresponding to the sub-bands needed to be reported to the base station.

2. The method according to claim 1, wherein the value of the M is obtained through dividing a transmission bandwidth in the system by a bandwidth in the CQI report sub-band, and N is no less than zero, but less than M.

3. The method according to claim 1, wherein in step c), the UE finds out the L-bit long sequence corresponding to sub-bands combination that needs to be reported for indication according to the corresponding relationship between the $L=\lceil \log_2 C_M^N \rceil$ bits long sequence and combination formed by selecting N report sub-bands from M ones.

4. The method according to claim 1, wherein the indication of the indexes of the reported sub-bands via the L-bit long sequence accompanies with the report of the CQI values in corresponding sub-bands.

5. The method according to claim 1, wherein after the indication of the reported CQI sub-bands with the L bit long sequence, several times of the indication of corresponding CQI values will be transmitted.

6. The method according to claim 1, wherein in step c), the UE transmits the L-bit long sequence for the indication of reported sub-bands to the base station via physical layer signaling.

7. The method according to claim 1, wherein in step c), the UE transmits the L-bit long sequence for the indication of reported sub-bands to the base station via high level layer signaling.

8. The method according to claim 1, wherein in step d), transmitting report CQI values in sub-bands comprising steps of:
    indicating a index of the CQI report sub-band bearing a maximum CQI value and the maximum CQI value;
    indicating differential values between the maximum CQI value and CQI values in other CQI report sub-bands.

9. The method according to claim 1, wherein a corresponding relationship table is stored in both the UE and the base station.

10. The method according to claim 1, wherein a corresponding relationship is determined by:
    the UE obtaining a total number M of CQI report sub-bands in the system and the number N of CQI report sub-bands needed to be reported;
    generating all possible M-bit long sequences whose N bits are set as "1";
    sorting the generated sequences according to their binary values;
    the UE measuring channel qualities for all sub-bands;
    selecting N CQI report sub-bands bearing optimal channel qualities as the N sub-bands to be reported, and determining a M-bit long bit-mapped sequence whose N bits are set as "1" corresponding to the combinations formed by selecting N sub-bands from the M CQI report sub-bands;
    according to the M-bit long sequence whose N bits are set as "1", finding out its sequence number among the sorted all M-bit long sequences whose N bits are set as "1"; and
    converting the decimal of the sequence number into a L-bit long binary sequence, which is the desired L-bit long sequence.

11. A method for a base station identifying Channel Quality Indication reported by a UE comprising steps of:
    a) the base station receiving CQI signaling reported from the UE via a CQI report channel;
    b) the base station extracting a L-bit long sequence indicating CQI report sub-bands from the CQI report signaling, and according to a relationship between combinations formed by picking N CQI report sub-bands out from M CQI report sub-bands and the L-bit long sequence, determining the CQI of which N sub-bands is reported by the UE; and
    c) obtaining CQI values of the report sub-bands extracted from the CQI signaling transmitted from the UE.

12. The method according to claim 11, wherein the base station obtains a total number of sub-bands in the system and the number of sub-bands required to be reported through standard specification or through signaling notification from a network entity.

13. The method according to claim 11, wherein in step b), according to a corresponding relationship between the $L=\lceil \log_2 C_M^N \rceil$ long sequence and the combinations formed through selecting N sub-bands from M ones, the N report sub-bands indicated by the L-bit long sequence is determined, wherein C is a combination function.

14. The method according to claim 13, wherein the base station obtains the corresponding relationship between the base station and the UE according to a corresponding relationship table stored in both the UE and the base station.

15. The method according to claim 13, wherein the determination of the corresponding relationship comprising steps of:
    the base station obtaining a total number M of CQI report sub-bands in the system and the number N of CQI report sub-band that need to be reported;
    the base station generating all possible M-bit long sequences whose N bits are set as "1";
    sorting the generated sequences according to their binary values;
    the base station receiving the CQI report signaling from the UE;

extracting the L-bit long sequence from the CQI report signaling;

converting this L-bit long sequence into a decimal number, and locating the sequence from all M-bit long sequences whose N bits are set as "1" according to the decimal value of the its sequence number.

16. The method according to claim 11, wherein in step c), extracting the CQI values of the CQI report sub-bands in the CQI signaling from the UE comprising steps of:

determining which sub-band bears the maximum CQI value among N CQI report sub-bands according to the extracted information bits that indicate the index of the sub-band bearing the maximum CQI value;

determining the reported maximum CQI value according to the worked out information bits that indicate the maximum CQI value;

determining the CQI values for the other N−1 CQI report sub-bands according to the calculated maximum CQI value and the difference bits that indicate the difference values between CQI values in the other N−1 CQI report sub-bands and the maximum CQI value.

17. An apparatus for a UE reporting Channel Quality Indication comprising an antenna, a RF receiver, an ADC, a guard spacing removing unit, an OFDM demodulation unit, further comprising:

a) a pilot signal-to-noise ratio measuring unit for measuring channel qualities of all sub-bands;

b) a UE control and process unit for determining frequency bands that need to be reported according to the channel qualities of all measured sub-bands, and according to a total number of sub-bands and a number of sub-bands that need to be reported, determining a bit sequence for the indication of report sub-bands and information bits for the indication of report CQI values to generate CQI report signaling; and c) a transmitter for transmitting the generated CQI report signaling to a base station.

* * * * *